US009232426B2

(12) United States Patent
Rahman et al.

(10) Patent No.: US 9,232,426 B2
(45) Date of Patent: Jan. 5, 2016

(54) SYSTEM AND METHOD FOR IMPROVING INFORMATION CARRYING CAPACITY BY CONTROLLING RE-TRANSMISSIONS

(71) Applicants: CELLCO PARTNERSHIP, Basking Ridge, NJ (US); Verizon Patent and Licensing Inc., Basking Ridge, NJ (US)

(72) Inventors: Iftekhar Rahman, Billerica, MA (US); Arda Aksu, Martinez, CA (US); Yee Sin Chan, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 63 days.

(21) Appl. No.: 13/666,905

(22) Filed: Nov. 1, 2012

(65) Prior Publication Data

US 2014/0119212 A1    May 1, 2014

(51) Int. Cl.
*H04W 24/10* (2009.01)
*H04L 1/18* (2006.01)
*H04L 1/20* (2006.01)

(52) U.S. Cl.
CPC ............. *H04W 24/10* (2013.01); *H04L 1/1825* (2013.01); *H04L 1/1877* (2013.01); *H04L 1/20* (2013.01)

(58) Field of Classification Search
CPC .......... H04L 29/0523; H04L 47/2441
See application file for complete search history.

(56) References Cited

U.S. PATENT DOCUMENTS

| 6,947,750 | B2 * | 9/2005 | Kakani et al. ............... 455/452.2 |
| 7,126,917 | B2 * | 10/2006 | Harris et al. .................... 370/235 |
| 7,310,529 | B1 * | 12/2007 | Lodge et al. ................... 455/445 |
| 7,392,055 | B2 * | 6/2008 | Li et al. ........................ 455/452.2 |
| 7,593,339 | B2 * | 9/2009 | Shoemake et al. ............. 370/235 |
| 8,312,337 | B2 * | 11/2012 | Park et al. ...................... 714/748 |
| 8,553,526 | B2 * | 10/2013 | Meylan et al. ................. 370/216 |
| 2011/0222406 | A1 * | 9/2011 | Persson et al. ................ 370/236 |

* cited by examiner

*Primary Examiner* — Shripal Khajuria
*Assistant Examiner* — Sasha Cintron Pacheco (57) ABSTRACT

The re-transmission of transmission units (TUs) received in a communication device over a communication link is controlled to improve the information carrying capacity of the link. A received TU has an associated service characteristic indicative of a quality of service (QOS) for the TU. The service characteristic is associated with a select set of key performance indicators (KPIs), such as measures of packet error, packet delay, packet delay variation, and/or packet loss experienced by TUs on the communication link. Upon receipt of a TU, the performance of the communication link is evaluated with respect to each KPI in the select set to obtain a corresponding measurement value, and the measurement values are compared to corresponding threshold values. Upon determining that a determined performance value does not satisfy a corresponding threshold value for a KPI in the select set, re-transmission of the TU is requested.

22 Claims, 6 Drawing Sheets

SYSTEM AND METHOD FOR IMPROVING INFORMATION CARRYING CAPACITY BY CONTROLLING RE-TRANSMISSIONS

BACKGROUND

Communications over wired and wireless links are subject to degradation as a result of electromagnetic interference, changes to propagation characteristics of the transmission media, transmission losses, and synchronization errors. Packets transmitted from one device therefore commonly contain errors upon receipt at their intended destination, and/or fail to be received at the destination.

A number of network protocols have been designed in order to minimize the loss of data during transmission. For example, networks conforming to Long Term Evolution (LTE) protocols use a hybrid automatic repeat request (HARQ) error-control method to maximize information throughput. HARQ methods use a combination of error correction coding and repeat requests to provide almost lossless communication links. In particular, HARQ maximizes the possibility of errorless delivery of data packets over the air interface by repeating the packets that are received with errors.

Different applications have different requirements for the data received over wired and wireless communication links. For example, real-time voice or video communication applications can maintain conversational audio/video quality without requiring lossless or errorless delivery of audio/video packets. However, the real-time voice or video communication applications may be sensitive to delay. Such applications may therefore not require repetition of all lost or erroneous audio packets, and repetition of such packets may cause inefficient use of an LTE communication link. In contrast, file transfer applications are generally sensitive to packet loss but insensitive to delay. Such applications may therefore rely on repetition of all lost or erroneous audio packets to ensure lossless reception of all packets across the LTE communication link.

In order to make efficient use of communication links and improve the information carrying capacity of such links, systems and methods are therefore needed to control the re-transmission of packets based on characteristics of the transmitted information.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to controlling re-transmissions in a wired or wireless communications link so as to improve the information carrying capacity of the link.

A communications link, such as a mobile wireless communication link operating using a Long Term Evolution (LTE) network protocol, can be used to transmit and receive transmission units (TUs) having different quality of service (QOS) requirements. The transmission units may be individual packets (i.e., single packets), groups of two or more packets, part of a data payload from one packet, or other units of transmitted data. The QOS requirements are used to ensure that the data or information contained in the received TUs meets a minimum standard required of the data. The QOS parameters can impose requirements on received TUs, such as requiring that received TUs contain no (or fewer than a maximum threshold number of) errors or that the received TU have a packet delay below a maximum threshold. More generally, the QOS parameters impose requirements on the communication link by requiring not only that each received TU meets certain requirements, but also that streams of TUs (or sets of multiple sequentially received TUs) meet certain requirements. QOS imposed on streams of TUs include limits on jitter or packet delay variation, packet loss rate, packet error rate, and the like.

TUs received across the same communication link may have different QOS requirements. For example, TUs received by a communication device and corresponding to a real-time voice communication can have different QOS requirements than TUs received by the same communication device (and across the same communication link) and corresponding to a file transfer communication. Each TU received by a communication device can therefore have an associated service characteristic which provides information on the QOS requirements for the TU. In particular, the QOS requirements for a TU are identified by key performance indicators (KPIs), and by thresholds associated with each KPI. In the example, TUs associated with a real-time voice call may be sensitive to delay and may therefore have a KPI corresponding to packet delay (or packet delay variation), while TUs associated with file transfer service may be sensitive to errors and may therefore have a KPI corresponding to errors. In general, the QOS requirements are determined for a stream of TUs, and each TU in the stream has the QOS requirements of the stream. The stream of TUs, which can also be referred to as a virtual flow of TUs, includes all TUs that are transmitted as part of a particular connection or session through the network. For example, a stream of TUs includes all of the TUs used to transmit a real-time voice communication over the period of time taken to transmit the real-time voice communication, or all of the TUs used to transmit a file as part of a file transfer operation.

Upon receipt of a TU in a communication device, the TU is examined to determine the service characteristic associated with the TU (and/or associated with the steam of TUs including the received TU). Based on the service characteristic, KPIs and corresponding KPI threshold values are selected for the TU. The KPIs (and corresponding threshold values) are used to evaluate the performance of the communication link, and to determine whether to request re-transmission of the received TU. For each of the selected KPIs, a performance measurement value (PMV) indicative of the performance of the communication link according to the KPI is determined for the received TU. In turn, for each of the selected KPIs, the determined PMV is compared with the corresponding KPI threshold value, and a determination is made as to whether to request re-transmission of the TU. The determination is based on determining that, for at least one identified KPI, a determined PMV does not satisfy a corresponding KPI threshold value.

The KPIs and thresholds are selected based on the service characteristic of the received TU or received TU stream. For example, for TUs and streams associated with conversational types of services such as voice and video calling, KPIs and associated KPI thresholds corresponding to delay and delay variation can be selected. For TUs and streams associated with file transfer types of services, KPIs and associated KPI thresholds corresponding to packet loss and packet error rates are selected. Users associated with premium service levels may have KPIs selected to provide higher quality communications, while users associated with basic service levels may have KPIs selected to require fewer network resources (e.g., lower communication bandwidth requirements, higher delay thresholds, or the like).

Reference now is made in detail to the examples illustrated in the accompanying drawings and discussed below.

Figure 1:
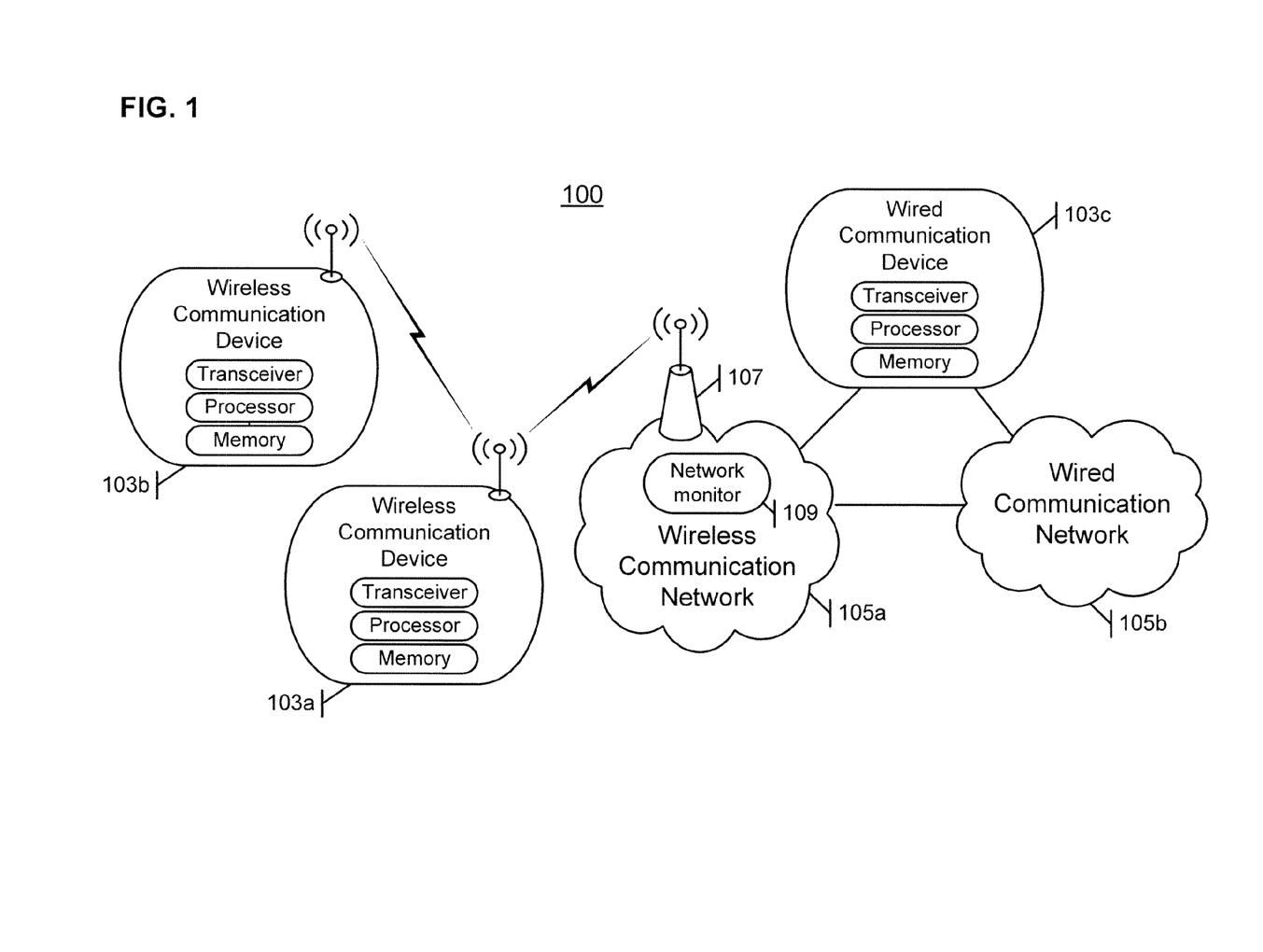
FIG. 1 is a high-level functional block diagram of an example of a system of networks/devices that provide various communications services and support an example of the selective re-transmission method.

FIG. 1 illustrates a system 100 offering a variety of communication services, including wired and wireless communication services enabling a wireless communication device 103a to communicate with one or more other wireless communication device 103b and/or wired communication device 103c.

Each communication device can include a processor and a transceiver operative to control the transmission and reception of communications to/from the communication device, including the transmission and reception of data or control packets and other types of transmission units (TUs). In particular, the processor and transceiver may be configured to control the re-transmission of TUs so as to improve the information carrying capacity of communication sessions and links under its control. As such, the processor may process a received TU so as to determine whether to control the transceiver to request a re-transmission of the TU, whether the TU should be forwarded to other elements of the receiving communication device for further processing, or whether the TU should be dropped. Each communication device may further include one or more program memories, data memories, user interfaces, communication interfaces, and the like used in concert with the transceiver to control the re-transmission of TUs received by the device. The program memories may store instructions for execution by the processor to cause the communication device to perform certain functions.

The communication devices 103a-c may communicate directly with each other, or communicate with each other through one or more wireless and/or wired communication networks 105a and/or 105b. A wireless communication network 105a can be a mobile wireless communication network such as an LTE network (i.e., a wireless network conforming to LTE-compliant communication standards and protocols), a WIFI or other packet-based wireless network, or the like. A wired core communication network, such as a WAN, LAN, or the Internet, may be used for routing of communications between a base station, wireless router, or other access point 107 of a wireless communication network and a communication device connected to the wired network.

A communication network optionally includes a network monitor 109, which can form part of an access point 107 in a wireless communication network. The network monitor 109 monitors and evaluates the performance of the network by measuring communication parameters of TUs travelling through the network, such as packet loss, delay, jitter, and error. The monitor thereby calculates network parameters such as network load, network congestion, network capacity, and network transmission reliability, and can communicate the network parameters to devices 103a-c communicating through the network. The network parameters can be communicated periodically, upon request by the devices 103a-c, or when the parameters exceed (or drop below) predetermined thresholds (e.g., the network parameters may be communicated only when the network is congested, such as when measures of network load and/or congestion exceed certain thresholds). The network parameters can be calculated based on transmission reports received from transmitting and/or receiving devices 103a-c, based on transmission reports received from switches, routers, or other components of the network, or the like. The monitor may, in one example, monitor propagation or transmission impairments within the network, and calculate the network transmission reliability based on the monitoring.

In some examples, communications between devices 103a-c may be routed through one or more routers, switches, or servers which may themselves include circuitry for requesting re-transmission of the routed TUs. In other examples, the re-transmission of received TUs can only be requested by the destination device of the communication (and not by intermediary devices such as routers or switches), and the re-transmission is an end-to-end re-transmission which originates from the source device of the communication.

In order to improve the information carrying capacity of communication sessions and links involving the communication devices 103a-c, the processors and transceivers of the devices can be configured to examine received TUs so as to determine whether to request re-transmission of the TUs. FIGS. 2-5 describe various procedures that may be used in examining a received TU and determining whether re-transmission of the received TU should be requested.

In some examples, other devices involved in multi-hop transmissions of TUs between communication devices may also be configured to examine TUs received across one hop of a multi-hop transmission, so as to determine whether to request re-transmission of the TUs over the one hop. In one example, a router, switch, or server located in a communication path between two communication devices 103 may receive TUs being communicated between the devices 103. The router, switch, or server may examine received TUs so as to determine whether to request re-transmission of a TU prior to forwarding the TU along the communication path to the destination device. In the multi-hop example, the one hop over which the TU is requested to be re-transmitted can be a hop between the device performing the examining and the communication device from which the transmission originated. Alternatively, in an example in which multiple devices along the multi-hop transmission examine TUs, the one hop may be a hop between the device examining the TU and an immediately preceding device along the transmission having performed a previous examination of the TU along the transmission.

Figure 2:
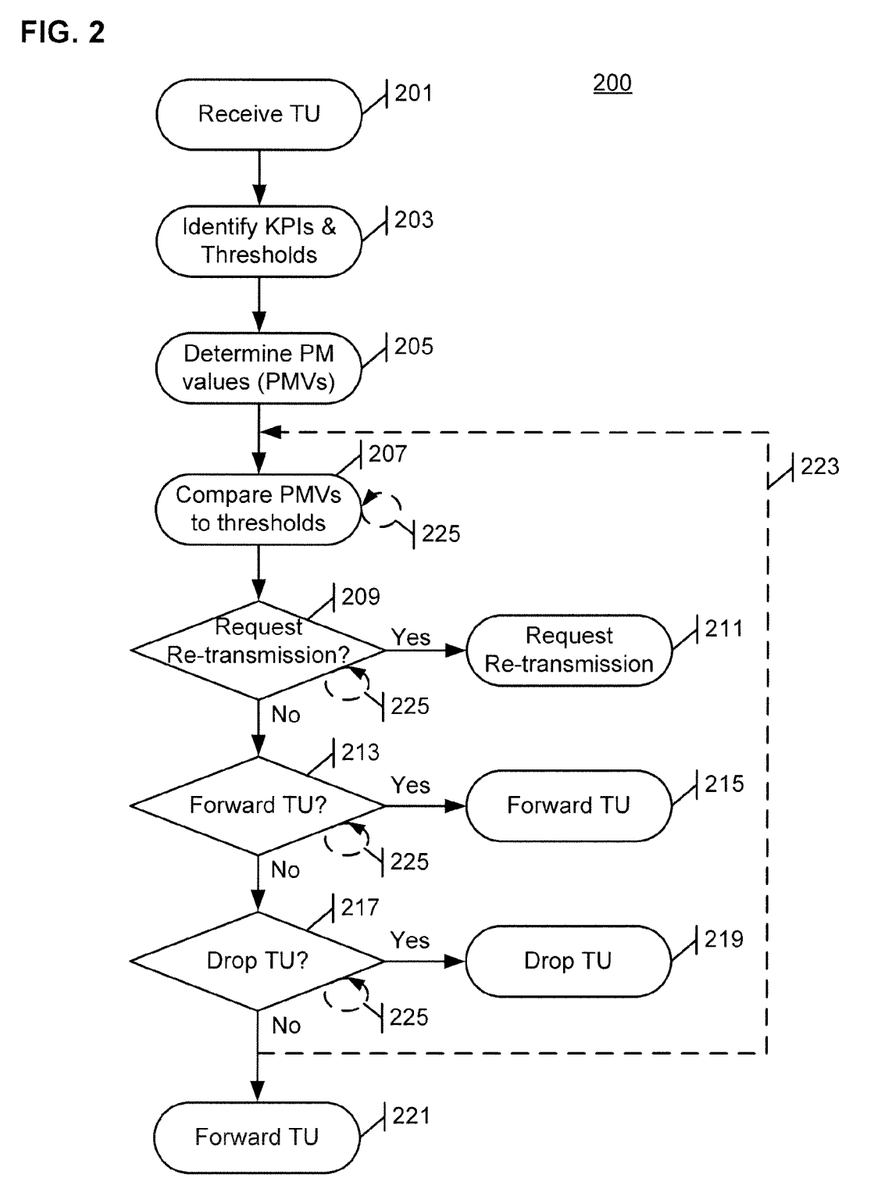
FIG. 2 is a flow diagram illustratively showing steps of a method for controlling re-transmissions so as to improve the information carrying capacity of a communication link.

FIG. 2 is a flow diagram illustratively showing a series of steps of a method 200 that may be used in controlling re-transmissions so as to improve the information carrying capacity of a communication link. The steps of method 200 may be performed in a processor, transceiver, or other controller used for maintaining a communication session on a wired or wireless communication link. In particular, method 200 is generally performed in a processor or transceiver of a communication device on a receiving end of the communication link (or on the receiving end of a hop of a multi-hop communication link). The method 200, however, can more generally be performed in a processor or transceiver of a relay device along the communication path, such as an access point 107, router, switch, or server along the communication path.

The method 200 begins at step 201 with the receipt of a transmission unit (TU). In one example, the TU includes one transmission packet or a predetermined number of two or more transmission packets. In another example, the TU can include only part of a data payload from one packet (such that the data payload of the packet is distributed across multiple TUs). The number of packets contained in a TU can be fixed based on a communication protocol used for the transmission or based on characteristics of a transmission link or network, or variable based on the communication protocol, transmission link or network characteristics, and/or a total number of packets being transmitted between two communication devices. The number of packets contained in a TU can be integer (e.g., 1, 2, or 3), or fractional (e.g., 0.5, 0.33, 0.25). The TU is received over a communication link such as a wireless link conforming to an LTE communication protocol, and the TU has an associated service characteristic.

The service characteristic of the TU provides information on desired quality of service (QOS) characteristics for the TU and/or of a TU stream including the received TU. In general, the service characteristic includes an indication of a type of communication transported by the TU or TU stream, such as file transfer service, streaming voice or video service, real-time voice or video call service, or the like. Different types of communication are, in turn, associated with different QOS requirements. The service characteristic can also include an indication of a class of service associated with the TU or TU stream (e.g., premium, standard, or economy service), which may be based on subscription levels of a sender and/or receiver of the TU, based on a user selected service class, or the like. The class of service can similarly be associated with different QOS requirements. The service characteristic can further include indication of an application associated with the TU or TU stream, such that particular QOS requirements are associated with the application.

The service characteristic of the received TU or the TU's stream is generally determined in the mobile communication device having received the TU and TU stream. The service characteristic can be determined based on an identifier in the TU indicative of the service characteristic (or of the QOS requirements) for a payload of the TU. The service characteristic can also be determined based on characteristics of the TU or TU stream. For example, the device may examine the received TU and, based on information identified about the TU, assign a service characteristic to the TU and its stream. For example, the device may identify that the TU is associated with a real-time voice call, and may assign a corresponding service characteristic to the TU based on the determination.

Alternatively, the service characteristic of a TU can be selected by a sender of the TU or TU stream (such as the application, device, or user having transmitted the TU or selected for transmission the data transported by the TU), and an identifier for the selected service characteristic is included in the TU. In another example, the service characteristic is selected by an element of the network through which the TU was transmitted, such as a router, switch, or server of the network.

Following reception of the TU, key performance indicators (KPIs) are identified in step 203 based on the service characteristic of the received TU or of the TU's stream. The KPIs are performance measures used to determine whether the received TU should be re-transmitted, forwarded, or dropped. The KPIs can include one or more measures such as packet delay, packet delay variation (jitter), packet loss rate, packet error rate, whether any errors are detected in the TU, or the like. In some examples, the KPIs form an ordered set in which the ordering of the KPIs is used to determine the order in which corresponding performance measures are evaluated. Different KPIs may be associated with different service characteristics, such that a particular set of one or more KPIs is identified for each received TU (or TU stream) based on the TU's service characteristics. In one example, a TU associated with transmission of a real-time voice or video call stream has a service characteristic associated with delay and delay variation KPIs. In the example, a TU associated with a file transfer has a transmission characteristic associated with packet loss rate and packet error rate KPIs.

Additionally, in step 203, KPI threshold values are identified corresponding to each of the KPIs for the service characteristic of the TU (and thus may change for different services). The threshold values are values which, when not satisfied by a performance measurement value of the TU, result in a request for re-transmission, forwarding, or dropping of the TU. A threshold value is not satisfied by a performance measurement value when the performance measurement value exceeds the threshold in certain cases (e.g., in the case of a maximum threshold), when the performance measurement value falls below the threshold in other cases (e.g., in the case of a minimum threshold), or when the performance measurement value falls outside of a range of thresholds in other cases.

The KPI threshold values are generally identified based on the service characteristic of the received TU. In one example, the KPI threshold values are identified based on a class of service of the service characteristic. In the one example, a KPI threshold is set so as to provide a higher QOS (e.g., corresponding to fewer permitted errors) for a premium service class than for an economy service class. In other examples, the KPI threshold values are further identified based on performance characteristics of the communication link and/or network through which the TU was received. The performance characteristics can include measures of network load, network congestion, network capacity, network transmission reliability, or the like. Measures of the performance characteristics can be received from a network monitor 107 connected to the receiving device 103, or a network monitor 107 of one or more networks in the communication path of the received TU. In the other examples, a KPI threshold is set so as to provide a higher QOS when network load, congestion, and/or network transmission reliability is relatively low, and a lower QOS when network load, congestion, and/or network transmission reliability is elevated.

In step 205, performance measurement values (PMVs) are determined for the KPIs identified in step 203. The PMVs may be measured based on the TU received at step 201, or evaluated based on measurement data obtained for the communication link over a period of time and/or based on the reception of several previously received or transmitted TUs. For example, a PMV corresponding to packet delay or the presence of an error may be measured based on the packet delay experienced by or error status of the TU received at step 201, of a predetermined number of most recently received TUs, or of TUs received during a predetermined time period (e.g., during the last 5 seconds). Packet delay variation (jitter), packet loss rate, and packet error rate may be measured based on packet delay variation, loss rate, or error rate of a predetermined number of most recently received TUs, or of TUs received during a predetermined time period. The PMVs may also be retrieved from a locally or remotely stored database storing PMVs for the communication link, and/or from a network monitor 107 monitoring the communication link (or parts thereof). For example, PMVs corresponding to network load, network congestion, network capacity, network transmission reliability, or the like may be retrieved (e.g., upon request, periodically, or the like) from network servers or from network monitors of the communication network(s) across which the TU was received.

For each KPI identified in step 203, the determined PMV is compared to the corresponding KPI threshold in step 207, and a determination is made as to whether the PMV satisfies the KPI threshold. In cases in which the KPI threshold is a minimum threshold, the PMV is determined to satisfy the threshold if the PMV exceeds the KPI threshold value. Conversely, in cases in which the KPI threshold is a maximum threshold, the PMV is determined to satisfy the threshold if the PMV is below the KPI threshold value. Finally, in cases in which the KPI threshold is an interval between minimum and maximum threshold values, the PMV is determined to satisfy the threshold if the PMV exceeds the minimum value and is below the maximum value.

Based on the determination of step 207, the TU received is step 201 can be processed in various ways. A request for retransmission of the TU can be generated and transmitted across the communication link (steps 209, 211), the TU can be forwarded to the receiving device for further processing (steps 213, 215), or the TU can be dropped (steps 217, 219). For example, if a PMV was determined not to satisfy the corresponding KPI threshold in step 207, re-transmission can be requested in step 211. However, if all PMVs were determined to satisfy the corresponding KPI thresholds in step 207, re-transmission is generally not requested and operation proceeds to step 213.

While FIG. 2 shows a single series of steps 207-219, the steps may be repeated for each of the KPIs identified in step 203. In one example, the steps are repeated sequentially for each identified KPI (as shown at 223), such that steps 207-219 are performed for a first KPI and, upon determining that a re-transmission is not requested (steps 209) and that the TU should not necessarily be forwarded (step 213) or dropped (step 217) based on the first KPI, the steps 207-219 can be repeated for a second (or other subsequent) KPI. In the one example, in situations in which the KPIs are ordered, the steps may be repeated sequentially for each identified KPI in the order identified by the ordered set of KPIs.

In another example, the steps are repeated for each identified KPI such that step 207 is performed for each identified KPI (as shown at 225) prior to proceeding to step 209, which in turn is performed for each identified KPI. If any of the KPIs do not satisfy the corresponding threshold, a re-transmission is requested at step 211. Otherwise, operation proceeds to step 213 which is itself performed for each identified KPI.

Each of the determinations of steps 209, 213, and 217 are based on the KPIs and corresponding threshold values and PMVs. Upon performing steps 207-219 for each of the KPIs identified in step 203, if the determinations do not result in the TU being subject to a re-transmission request (step 211), or forwarded (step 215) or dropped (step 219), the TU is subject to a default outcome. In the example shown in FIG. 2, the default outcome results in the TU being forwarded to the receiving device for further processing in step 221.

Figure 3:
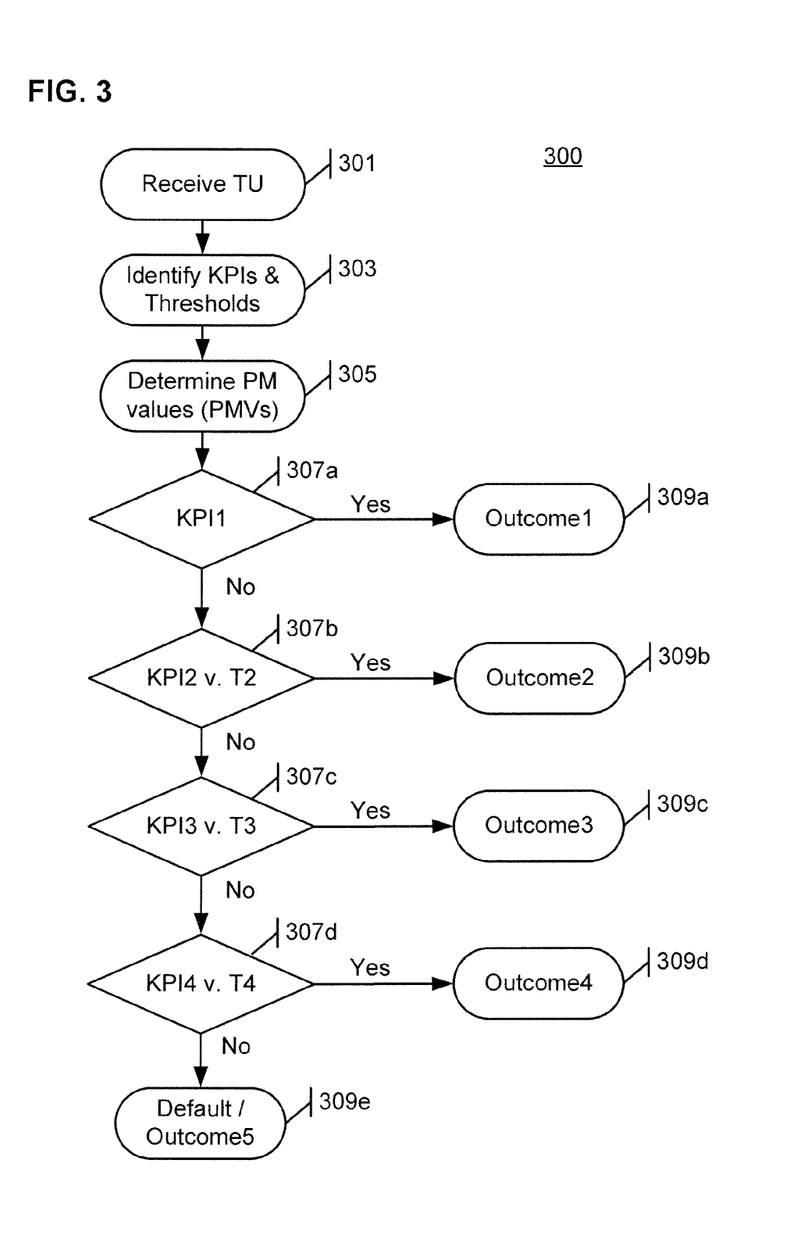
FIG. 3 is a flow diagram illustratively showing steps of a generalized method for controlling re-transmissions of transmission units (TUs) according to an ordered set of key performance indicators (KPIs).
Figure 4:
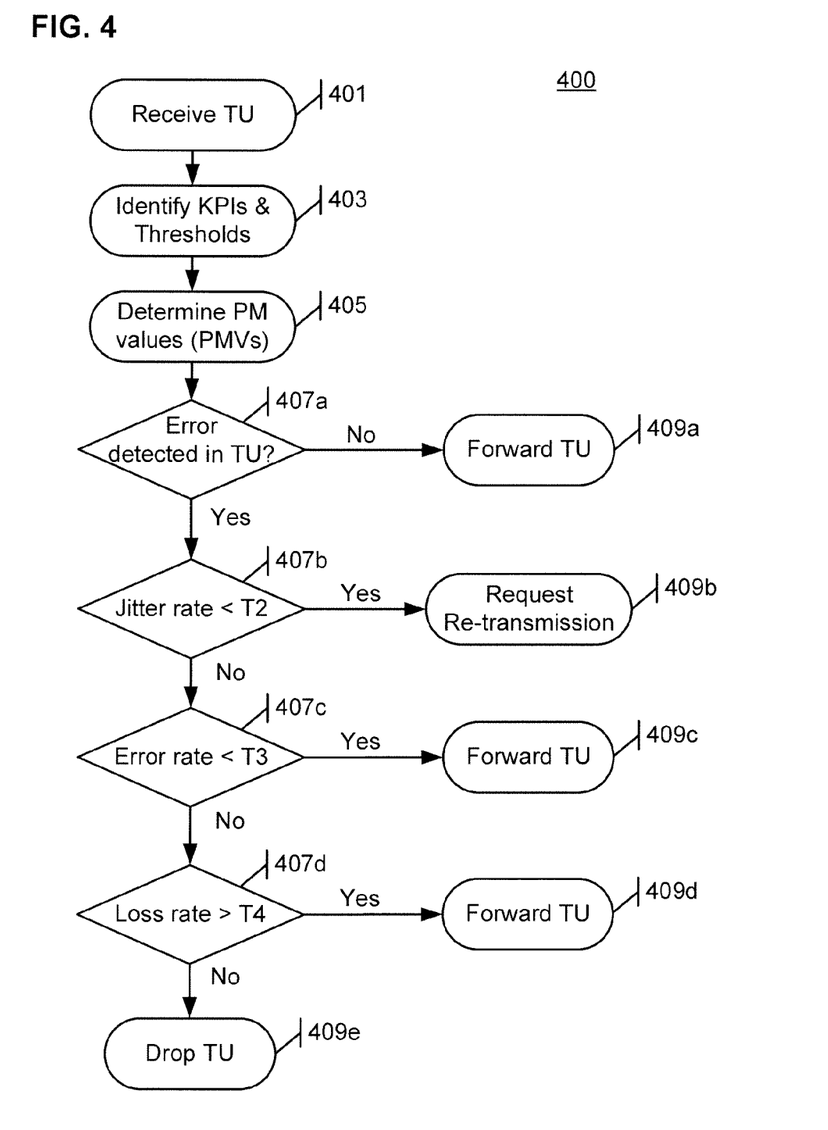
FIG. 4 is a flow diagram showing an illustrative example of controlling re-transmissions of TUs using a set of selected, ordered KPIs according to the method of FIG. 3.

While FIG. 2 shows a general method for controlling re-transmissions on a communication link, FIGS. 3 and 4 show more specific examples in which ordered sets of KPIs are used to control re-transmissions of TUs on communication links.

The methods 300 and 400 shown in FIGS. 3 and 4 enable ordered sets of KPIs (and corresponding thresholds) to be selected, and individual outcomes to be selected for each selected KPI. Outcomes include the forwarding of the TU to a processor, memory, or other element of the receiving communication device for processing; the generating and transmitting of a request for re-transmission of the TU; the dropping of the TU; or the like. Method 400 shows one illustrative example of method 300 in which an illustrative set of KPIs, thresholds values, and outcomes are used to control the re-transmission of a received TU. The example of method 400 is illustrative, and different numbers of KPIs, ordering of KPIs, selection of KPIs and associated thresholds, and outcomes can be selected depending on the received TU and the TU's associated service characteristics.

The method 400 is based on the KPIs shown in the following table:

| Order | KPI | Threshold | Min/Max | Outcome |
|---|---|---|---|---|
| 1 | Error in TU | 1 | Max | Forward |
| 2 | Jitter rate | T2 | Max | Re-transmit |
| 3 | Error rate | T3 | Max | Forward |
| 4 | Loss rate | T4 | Min | Forward |
| 5 | Default | | | Drop |

The methods 300 and 400 respectively begin with steps 301-305 and 401-405, which are substantially similar to steps 201-205, and reference can be made to the corresponding steps 201-205 of method 200 for additional detail. In steps 307a-d, the PMV corresponding to each of an ordered set of KPIs is evaluated with respect to a corresponding KPI threshold, and a determination is made as to whether the PMV satisfies the corresponding threshold. If a PMV satisfies a threshold, a corresponding outcome operation is undertaken in a corresponding step 309a-d. However, if the PMV does not satisfy the threshold, operation passes to evaluating the PMV corresponding to the next ordered KPI in one of steps 307b-d. If all PMVs fail to satisfy the corresponding thresholds, the method 300 ends with a default outcome in step 309e. In general, the outcomes can be selected from the set consisting of re-transmission, forwarding, and dropping of the TU.

In the particular example of method 400, the first KPI to be considered determines whether an error is detected in the TU (step 407a). As shown in the table above, the maximum threshold value of 1 indicates that if a single error is found, the determination of step 407a will follow the "Yes" branch to step 407b. The error detection determination can be based on calculating a cyclic redundancy check (CRC) value or other error-detection value for the received TU, and comparing the calculated CRC value to a check value included in the TU. If no error is detected (e.g., the calculated CRC value equals the check value), the TU is forwarded (step 409*a*) as indicated in the "Outcome" column of the table above. In particular, the TU is forwarded in step 409*a* without considering any of the further KPIs included in the set of KPIs (i.e., without performing steps 407*b-d* or otherwise evaluating the second, third, or fourth KPIs). However, if one or more errors are detected, processing passes to the second KPI.

The second KPI corresponds to a jitter rate and a maximum threshold of T2. If the jitter rate is determined to be lower than the maximum threshold T2 (step 407*b*), the TU is requested to the re-transmitted (step 409*b*) as indicated in the "Outcome" column of the table. If the TU is requested to be re-transmitted in step 409*b*, the further KPIs are not considered (i.e., steps 407*c-d* are skipped and the third and fourth KPIs are not evaluated). However, if the jitter rate is higher than the maximum threshold T2, processing passes to the third KPI in step 407*c*.

The third KPI corresponds to an error rate and a maximum threshold of T3. If the error rate is determined to be lower than the maximum threshold T3 (step 407*c*), the TU is forwarded (step 409*c*) as indicated in the "Outcome" column of the table without evaluating the fourth KPI. However, if the error rate is higher than the maximum threshold T3, processing passes to the fourth KPI in step 407*d*.

The fourth KPI corresponds to a loss rate and a minimum threshold of T4. If the loss rate is determined to be higher than the minimum threshold T4 (step 407*d*), the TU is forwarded (step 409*d*) as indicated in the "Outcome" column of the table. However, if the loss rate is lower than the minimum threshold T4, processing passes to the fifth KPI in step 409*e*.

The fifth KPI corresponds to a default outcome of dropping the packet. Therefore, if the TU has not been forwarded (e.g., steps 409*a*, 409*c*, or 409*d*), requested to be re-transmitted (e.g., step 409*b*), or dropped based on determinations related to the first, second, third, or fourth KPIs, the default outcome causes the packet to be dropped (step 409*e*).

Once the outcome is determined and the corresponding step is performed (i.e., once one of steps 409*a-e* is performed), control may return to step 401 in which a next TU is received. The next received TU may correspond to a re-transmitted version of the previously processed TU in cases in which a re-transmission was requested. The next received TU may also correspond to a next packet in a stream of packets being received by the transceiver.

The illustrative method 400 may be used to process a TU which corresponds to a conversational voice service characteristic. Based on the identified conversational voice service characteristic, the KPIs of jitter, error, and loss (in that order) are identified. In addition, KPI thresholds are identified, based on the conversational voice service characteristic, such that T2 is a 16 millisecond jitter threshold, T3 is a 1% error rate threshold, and T4 is a 0.1% loss rate threshold.

The KPI thresholds T2, T3, and T4 may be fixed for the service characteristic. Alternatively, the KPI thresholds can be periodically adjusted (e.g., at 30 second intervals) in order to maintain service quality in response to changes in service quality or network characteristics. For example, in a situation in which service quality is good, the thresholds can be relaxed (e.g., by increasing maximum thresholds or decreasing minimum thresholds). The service quality may be determined to be good if the KPI thresholds are not exceeded for a predetermined number of consecutive intervals (e.g., for 6 consecutive 30 s intervals). Conversely, in a situation in which service quality is bad, the thresholds can be tightened (e.g., by lowering maximum thresholds or increasing minimum thresholds). The service quality may be determined to be bad if the KPI thresholds are repeatedly exceeded during the predetermined number of consecutive intervals (e.g., thresholds are exceeded for more than 4 out of 6 prior consecutive intervals).

The illustrative method 400 may also be used to process a TU which corresponds to a streaming video service characteristic. Based on the identified streaming video service characteristic, the KPIs of jitter, error, and loss are also identified. However, the KPIs are re-ordered such that loss rate is checked first, error rate second, and jitter last. Also, different KPI thresholds are identified based on the streaming video service characteristic, such that $T_{jitter}$ is a 100 millisecond jitter threshold, $T_{error\_rate}$ is a 0.1% error rate threshold, and $T_{loss\_rate}$ is a 0.01% loss rate threshold.

While the examples of methods 300 and 400 include four KPIs and five outcomes, different numbers of KPIs and outcomes may be used. In one example, fewer KPIs and outcomes may be used (e.g., 2 KPIs and 3 outcomes) in order for the device to be able to complete the method 300/400 more efficiently. In another example, higher numbers of KPIs and outcomes may be used so as to more precisely decide when re-transmissions should be requested.

Figure 5:
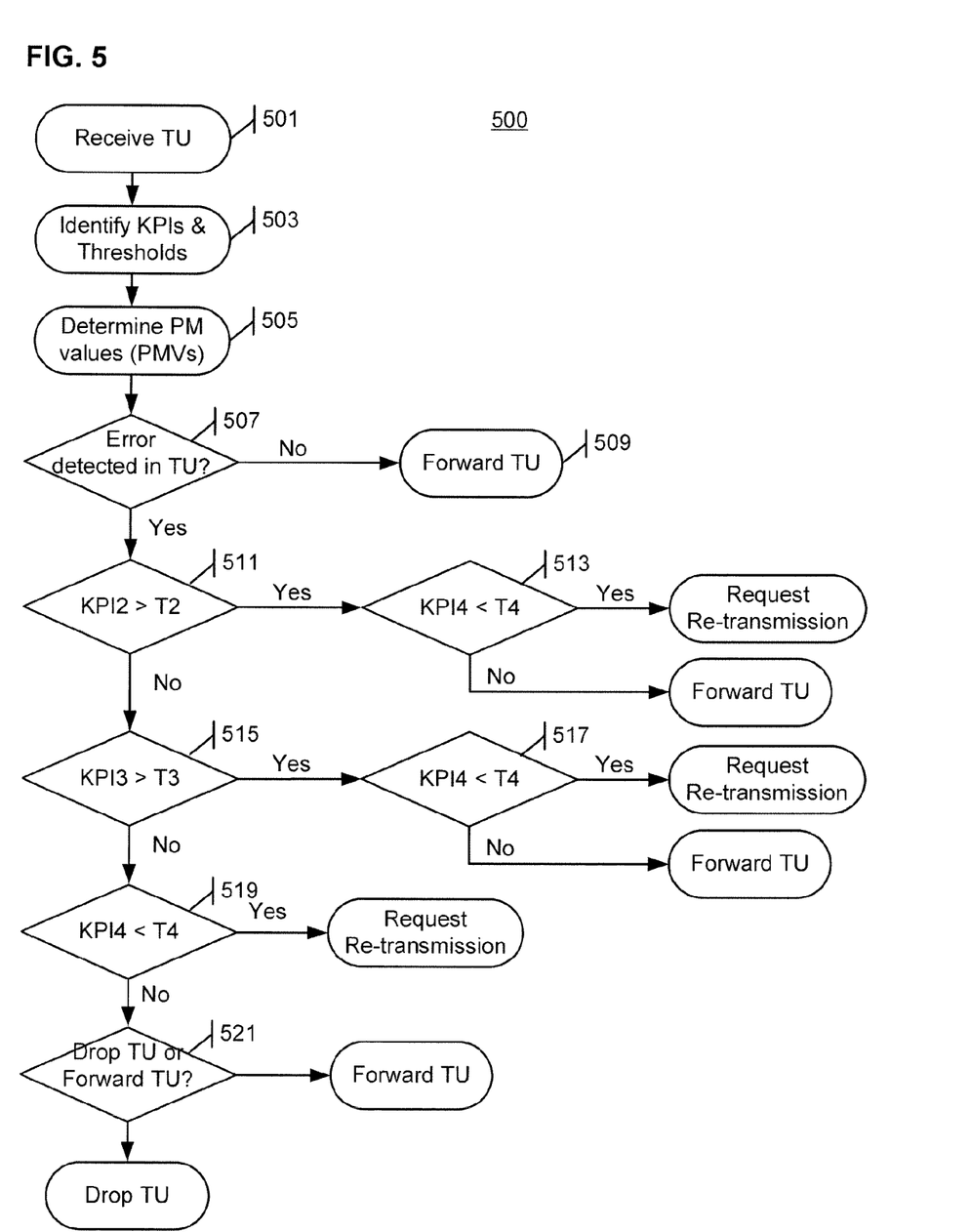
FIG. 5 is a flow diagram showing another illustrative method for controlling re-transmissions of TUs using a select ordered set of KPIs.

FIG. 5 is a flow diagram showing another illustrative method 500 for controlling re-transmissions of TUs using a select ordered set of KPIs. In the method 500, the outcome of a determination relating to one KPI may influence the choice of future KPIs. Hence, the "Outcome" associated with a particular KPI can be selected from the set consisting of re-transmission, forwarding, or dropping of the TU, or evaluation of another KPI.

The method 500 is based on the KPIs shown in the following table:

| Order | KPI | Threshold | Min/Max | Outcome |
|---|---|---|---|---|
| 1 | Error in TU | 1 | Max | Forward |
| 2 | KPI 2 | T2 | Min | KPI 4 |
| 3 | KPI 3 | T3 | Min | KPI 4 |
| 4 | KPI 4 | T4 | Max | Re-transmit |
| 5 | Default | | | Forward |

The method 500 begins with steps 501-505 which are substantially similar to steps 201-205, and reference can be made to the corresponding steps 201-205 of method 200 for additional description and detail. In step 507, a determination is made as to whether errors are detected in the received TU. If no errors are detected, the TU is forwarded in step 509 without evaluating any of the further KPIs. However, if one or more errors are detected, the next ordered KPI (i.e., KPI2) is evaluated in step 511. If the PMV corresponding to KPI2 satisfies the threshold T2, operation passes to KPI4 (step 513) as indicated in the "Outcome" column of the table corresponding to KPI2. If the PMV corresponding to KPI2 does not satisfy the threshold T2, the next ordered KPI (i.e., KPI3) is evaluated in step 515. If the PMV corresponding to KPI3 satisfies the threshold T3, operation passes to KPI4 (step 517) as indicated in the "Outcome" column of the table corresponding to KPI3. If the PMV corresponding to KPI3 does not satisfy the threshold T3, the next ordered KPI (i.e., KPI4) is evaluated in step 519. The PMV corresponding to KPI4 is thus evaluated either following step 511, step 515, or step 519. In each situation, if the PMV corresponding to KPI4 satisfies the threshold T4 (e.g., in any of steps 513, 517, and 519), re-transmission of the TU is requested and no further KPIs are evaluated with respect to the TU. In situations in which the PMV corresponding to KPI4 does not satisfy the threshold T4 (e.g., in any of steps 513, 517, and 519), an additional step 521 may be included in which a determination of whether to drop or forward the TU is included. The decision of step 521 may be based, for example, on an additional KPI.

The selection of a KPI as an "Outcome" enables the method 500 to more quickly and efficiently make a determination of how to process a received TU. In the example of method 500, for example, operation can directly skip from evaluating KPI2 (step 511) to evaluating KPI4 (step 513) in situations in which KPI2 is satisfied—thereby not requiring evaluation of KPI3 and saving the time and resources necessary to evaluate KPI3.

The particular selection of KPIs, KPI thresholds, and outcomes is generally dependent on service characteristics of a received TU. In the example of method 500, for example, KPI2, KPI3, and KPI4 can respectively be selected as a packet error rate, a packet loss rate, and a packet delay variation in situations in which the TU is a streaming audio service TU that has corresponding service characteristics. In the example, the KPIs are selected in inverse order of importance such that the KPI selected as KPI4 is considered to be more important than either of KPI2 and KPI3, and such that the KPI selected as KPI3 is considered to be more important than KPI2. In the example, KPI4 is selected as a maximum allowable packet delay variation, and the evaluation of KPI4 results in a re-transmission being selected only if the packet delay variation remains below a threshold T4. As a result, if delay variation is higher than T4, re-transmission is not requested so as not to cause further packet delay variation in the system; however, if delay variation is lower than T4, re-transmission is requested. In the example, KPI3 is selected as a minimum packet loss rate T3. If the packet loss rate is determined to exceed the minimum threshold T3, operation proceeds to step 517. However, if the packet loss rate is lower than T3, then operation proceeds to step 519. Finally, KPI2 is selected as a minimum packet error rate. As a result, if the packet error rate is observed to be high and to exceed a threshold T2, operation proceeds directly to evaluating KPI4 in step 513 without evaluating KPI3. However, if the packet error rate is low (and does not exceed threshold T2), operation proceeds to evaluation KPI3 prior to proceeding to an evaluation of KPI4.

In the example of method 500, an additional KPI (e.g., KPI5) corresponding to packet delay may be added for TUs that are conversational voice TUs. Because conversational voice TUs are delay sensitive, such packets may only be used if they are received within an acceptable delay. As a result, the additional KPI5 may be used in step 521 to selectively drop a TU having a packet delay exceeding the maximum acceptable delay threshold, or to forward the TU only if the packet delay is lower than the maximum acceptable delay.

Alternatively, only three KPIs corresponding to error detection, packet error rate, and packet delay can be used for processing TUs used in data transfer operations. In an example with only three KPIs, the flow diagram of method 300 may be used with KPI1 being used to determine whether the received TU contains any errors; KPI2 being used to determine whether a packet error rate threshold is satisfied; and KPI3 being used to determine whether a packet delay threshold is satisfied.

The particular ordering of KPIs can also be dependent on service characteristics of a received TU. As above, in the example of method 500, for a streaming audio service TU that has corresponding service characteristics, the KPI2, KPI3, and KPI4 can respectively be selected as a packet error rate, a packet loss rate, and a packet delay variation. For data transfer service, on the other hand, KPI2 can be selected as packet delay and KPI3 as packet error rate, in that order in the flow diagram of method 300.

In the case of a service which cannot tolerate any packet loss (such as certain high-fidelity data transfer services), the outcome corresponding to dropping a TU may not be available. In such services, received TUs may be requested to be re-transmitted if they are determined to include errors, and may be forwarded for further processing by the communication device once they are received without error. Since received TUs cannot be dropped, all received TUs are provided to the communication device without exception.

Each of methods 300, 400, and 500 show the step 305 of determining the PMVs as occurring prior to the evaluation of the KPIs in steps 307*a-d*, 407*a-d*, and 507-521. In some examples, however, instead of having a single step 305 used for determining PMVs corresponding to each of the KPIs used in the method, individual PMVs can be determined at the time of evaluating the corresponding KPI. In the example of method 300, for instance, a first PMV corresponding to KPI1 may be determined during (or immediately prior to) step 307*a*; similarly, second, third, and fourth PMVs corresponding to KPI2, KPI3, and KPI4 may respectively be determined during steps 307*b*, 307*c*, and 307*d*. In the example of method 500, first and second PMVs corresponding to KPI1 and KPI2 may respectively be determined during (or immediately prior to) steps 507 and 511. In the example of method 500, a third PMV corresponding to KPI3 may only be determined if step 515 is performed; however, if control passes from step 511 to step 513, the third PMV may not need to be determined.

The methods 200-500 described herein may be used in networks operating using communication protocols that generally cause all TUs that are determined to have one or more errors to be re-transmitted. Such communications protocols are configured, for example, to ensure that all communications are lossless and errorless by requiring any erroneous or lost data to be re-transmitted. Such communication protocols, however, may have high (or highly variable) delay resulting from potentially large numbers of re-transmissions. The methods 200-500 can be used in combination with the communication protocols to reduce the numbers of re-transmissions by determining whether to request re-transmission of error-containing TUs, whether to forward error-containing TUs, or whether to drop error-containing TUs. By reducing the numbers of re-transmissions, the methods can reduce network load on the networks, and control transmission delay for time-sensitive communication services. Thus, the types of KPIs, order in which the KPIs are checked, threshold values used in checking the KPIs, and/or result or outcome performed when a particular threshold value is not satisfied may vary based on the type of TU being received.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the controlling re-transmissions of transmission units on wired or wireless communications link. The software code is executable by the general-purpose computer that functions as a sending/source or receiving/destination communication device and/or that functions as a router or server along a communication path. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for controlling re-transmissions in essentially the manner performed in the implementations discussed and illustrated herein.

Figure 6:
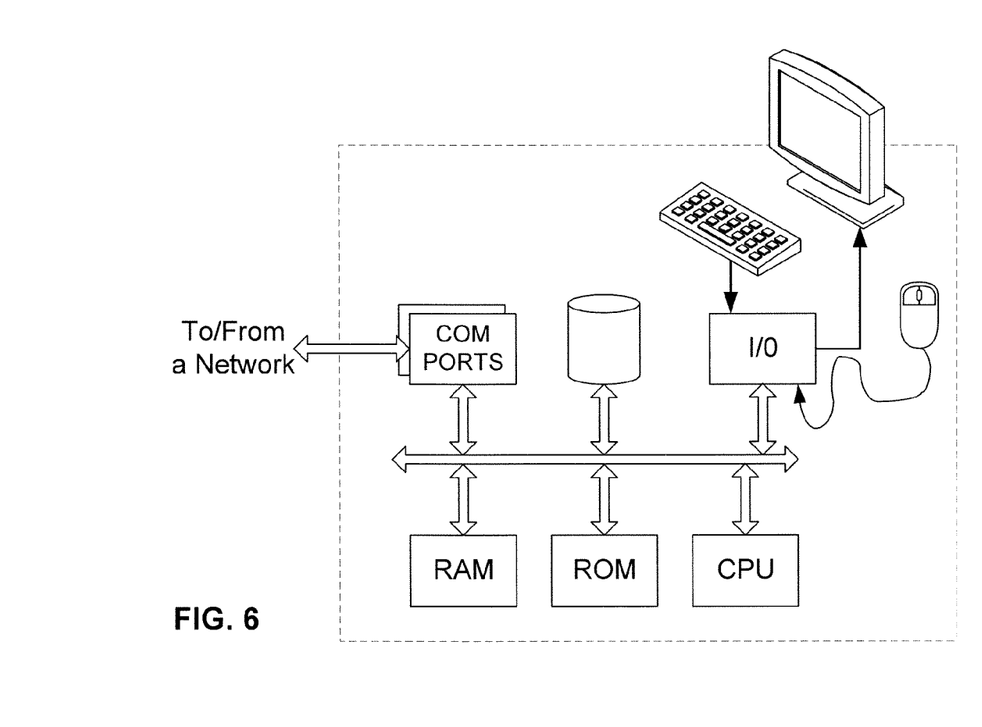
FIG. 6 is a simplified functional block diagram of a computer that may be configured as a host or server, for example, or as a personal computer or other work station or terminal or communication device.

FIG. 6 provides a functional block diagram illustration of a general purpose computer hardware platform, such as a network or host computer platform that may be used to implement a server, or a computer with user interface elements that may be used to implement a personal computer, work station, or terminal or communication device. A computer includes a data communication interface for packet data communication. The computer also includes a central processing unit (CPU), in the form of one or more processors, for executing program instructions. The computer typically includes an internal communication bus, program storage and data storage for various data files to be processed and/or communicated by the computer, although the computer often receives programming and data via network communications. The computer functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   receiving, in a communication device over a communication link, a transmission unit (TU) from a source, wherein:
     the TU is one of a flow of TUs including all TUs transmitted as part of a single session over the communication link;
     the TU has an associated service characteristic; and
     the associated service characteristic is one of a plurality of service characteristics;
   selecting, based on the associated service characteristic of the received TU, key performance indicators (KPIs) used to evaluate the performance of the communication link and a KPI threshold value corresponding to each selected KPI, wherein:
     the KPIs and corresponding KPI threshold values differ for each of the plurality of service characteristics; and
     at least one KPI is selected from the group consisting of:
       a presence of one or more errors in the received TU;
       a packet delay experienced by the received TU;
       a variation in the packet delay experienced by the received TU and one or more other TUs received by the communication device over the communication link;
       a packet loss rate experienced by the received TU and the one or more other TUs; and
       a packet error rate experienced by the received TU and the one or more other TUs;
   for each respective one of the selected KPIs, measuring the performance of the communication link according to the respective KPI to determine a performance measurement value (PMV) indicative of the performance of the communication link according to the respective KPI;
   for each of the selected KPIs, comparing the determined PMV to the corresponding KPI threshold value; and
   requesting, by the communication device, a re-transmission of the TU from the source upon determining that a determined PMV does not satisfy a corresponding KPI threshold value for one of the selected KPIs.

2. The method of claim 1, wherein the service characteristic of the received TU is indicative of at least one of:
   a type of communication transported by the TU;
   a class of service associated with the TU; and
   an application associated with the TU.

3. The method of claim 1, wherein the TU comprises two or more packets received over the communication link.

4. The method of claim 1, wherein each KPI threshold value corresponding to a selected KPI is selected based on the service characteristic of the TU and based on a network performance characteristic of a network the communication device is communicatively connected to.

5. The method of claim 4, wherein the network performance characteristic is a performance characteristic indicative of one of network load, network congestion, network capacity, and network transmission reliability.

6. The method of claim 1, wherein at least one KPI threshold value corresponding to a selected KPI is periodically adjusted based at least in part on a network performance characteristic of a network the communication device is communicatively connected to.

7. The method of claim 1, wherein:
the selected KPIs form an ordered set of KPIs in which ordering of the set is based on the service characteristic of the received TU; and
the steps of comparing the determined PMV to the corresponding KPI threshold value and requesting re-transmission of the TU upon determining that the determined PMV does not satisfy the corresponding KPI threshold value are performed for each KPI in the order indicated by the set of KPIs.

8. The method of claim 7, wherein:
a first KPI in the ordered set of KPIs corresponds to a presence of one or more errors in the received TU; and
upon determining that the received TU contains one or more errors, the steps of measuring the performance of the communication link, comparing the determined PMV to the corresponding KPI threshold value, and requesting re-transmission of the TU upon determining that the determined PMV does not satisfy the corresponding KPI threshold value are performed for a second KPI in the ordered set of KPIs.

9. The method of claim 1, wherein:
the re-transmission of the TU is requested upon determining that a PMV does not satisfy a corresponding KPI threshold value for a first one of the selected KPIs; and
the method further comprises:
requesting that the received TU be dropped upon determining that a PMV does not satisfy a corresponding KPI threshold value for a second one of the selected KPIs.

10. The method of claim 1, wherein the TU is received over a wireless communication link which conforms to a long term evolution (LTE) standard for wireless communication.

11. A communication device comprising:
a storage device;
a transceiver configured to receive transmission units (TUs) from other communication devices over a communication link;
one or more processors coupled to the transceiver and having access to the storage device; and
instructions embodied in the storage device which, when executed by the one or more processors, cause the communication device to perform functions including functions to:
receive, using the transceiver, a transmission unit (TU) from another communication device over the communication link, wherein:
the TU is one of a flow of TUs including all TUs transmitted as part of a single session over the communication link;
the TU has an associated service characteristic; and
the associated service characteristic is one of a plurality of service characteristics;
select, based on the associated service characteristic of the received TU, key performance indicators (KPIs) used to evaluate the performance of the communication link and a KPI threshold value corresponding to each selected KPI, wherein:
the KPIs and corresponding KPI threshold values differ for each of the plurality of service characteristics; and
at least one KPI is selected from the group consisting of:
a presence of one or more errors in the received TU;
a packet delay experienced by the received TU;
a variation in the packet delay experienced by the received TU and one or more other TUs received by the communication device over the communication link;
a packet loss rate experienced by the received TU and the one or more other TUs; and
a packet error rate experienced by the received TU and the one or more other TUs;
for each respective one of the selected KPIs, measure the performance of the communication link according to the respective KPI to determine a performance measurement value (PMV) indicative of the performance of the communication link according to the respective KPI;
for each of the selected KPIs, compare the determined PMV to the corresponding KPI threshold value; and
request, from the other communication device, a re-transmission of the TU upon determining that a determined PMV does not satisfy a corresponding KPI threshold value for one of the selected KPIs.

12. The device of claim 11, wherein the service characteristic of the received TU is indicative of at least one of:
a type of communication transported by the TU;
a class of service associated with the TU; and
an application associated with the TU.

13. The device of claim 11, wherein the TU comprises two or more packets received over the communication link.

14. The device of claim 11, wherein each KPI threshold value corresponding to a selected KPI is selected based on the service characteristic of the TU and based on a network performance characteristic of a network the communication device is communicatively connected to.

15. The device of claim 14, wherein the network performance characteristic is a performance characteristics of the network indicative of one of network load, network congestion, network capacity, and network transmission reliability.

16. The device of claim 11, wherein at least one KPI threshold value corresponding to a selected KPI is periodically adjusted based at least in part on a network performance characteristic of a network the communication device is communicatively connected to.

17. The device of claim 11, wherein:
the selected KPIs form an ordered set of KPIs in which ordering of the set is based on the service characteristic of the received TU; and
the functions of comparing the determined PMV to the corresponding KPI threshold value and of requesting re-transmission of the TU upon determining that the determined PMV does not satisfy the corresponding KPI threshold value are performed for each KPI in the order indicated by the set of KPIs.

18. The device of claim 17, wherein:
a first KPI in the ordered set of KPIs corresponds to a presence of one or more errors in the received TU; and
upon determining that the received TU contains one or more errors, the functions of measuring the performance of the communication link, comparing the determined PMV to the corresponding KPI threshold value, and requesting re-transmission of the TU upon determining that the determined PMV does not satisfy the corresponding KPI threshold value are performed for a second KPI in the ordered set of KPIs.

19. The device of claim 11, wherein:
the re-transmission of the TU is requested upon determining that a determined PMV does not satisfy a corresponding KPI threshold value for a first one of the selected KPIs; and
the instructions further cause the one or more processors to perform a function to:
request that the received TU be dropped upon determining that a determined PMV does not satisfy a corresponding KPI threshold value for a second one of the selected KPIs.

20. The device of claim 11, wherein the TU is received by the transceiver over a wireless communication link which conforms to a long term evolution (LTE) standard for wireless communication.

21. A method comprising:
receiving, in a communication device over a communication link, a transmission unit (TU) from a source, wherein:
the TU is one of a flow of TUs including all TUs transmitted as part of a single session over the communication link;
the TU has an associated service characteristic; and
the associated service characteristic is one of a plurality of service characteristics;
selecting, based on the associated service characteristic of the received TU, key performance indicators (KPIs) used to evaluate the performance of the communication link and a KPI threshold value corresponding to each selected KPI, wherein:
the KPIs and corresponding KPI threshold values differ for each of the plurality of service characteristics; and
at least one KPI is selected from the group consisting of:
a presence of one or more errors in the received TU;
a packet delay experienced by the received TU;
a variation in the packet delay experienced by the received TU and one or more other TUs received by the communication device over the communication link:
a packet loss rate experienced by the received TU and the one or more other TUs; and
a packet error rate experienced by the received TU and the one or more other TUs;
for each respective one of the selected KPIs, measuring the performance of the communication link according to the respective KPI to determine a performance measurement value (PMV) indicative of the performance of the communication link according to the respective KPI;
for each of the selected KPIs, comparing the determined PMV to the corresponding KPI threshold value; and
upon determining that a determined PMV does not satisfy a corresponding KPI threshold value for one of the selected KPIs, performing one of requesting a re-transmission of the TU from the source, dropping the TU, and forwarding the TU to an element of the communication device for further processing.

22. The method of claim 21, further comprising:
for each respective one of the selected KPIs, selecting an operation to be performed if a determined PMV does not satisfy a corresponding KPI threshold value,
wherein the selected operation is one of requesting re-transmission of the TU, dropping the TU, and forwarding the TU to an element of the communication device for further processing, and
wherein upon determining that a determined PMV does not satisfy a corresponding KPI threshold value for one of the selected KPIs, the selected operation is performed.

* * * * *